UNITED STATES PATENT OFFICE.

MARSTON TAYLOR BOGERT, OF NEW YORK, N. Y.

PRODUCTS OBTAINABLE FROM 4.6-DIAMINO-1.3-XYLENE AND PROCESS OF MAKING.

1,032,734. Specification of Letters Patent. Patented July 16, 1912.

No Drawing. Application filed April 22, 1909. Serial No. 491,499.

*To all whom it may concern:*

Be it known that I, MARSTON TAYLOR BOGERT, a citizen of the United States, and a resident of the city of New York, borough of Manhattan, in the county and State of New York, have invented certain new and useful Improvements in Products Obtainable from 4.6-Diamino-1.3-Xylene and Processes of Making, of which the following is such a full, clear, and accurate description as will enable any one skilled in the art to which it appertains to make and use the same.

My invention relates to the production of certain new mother-substances and the production therefrom of a series of new and useful products. Both the mother-substances and the products therefrom, although differing considerably in properties, possess in common the following generic nucleus:—

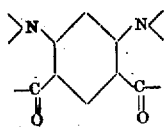

One series of these products contains the following specific nucleus:—

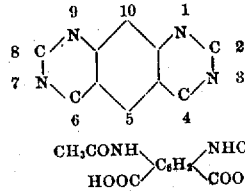

and which is hereinafter referred to as the naphthotetrazin nucleus, or the 1, 3, 7, 9 naphthotetrazin nucleus.

By acetylating and then oxidizing 4.6-diamino-1.3-xylene, I obtain the new body 4.6-diacetamino-1.3-phthalic acid according to the following equation:

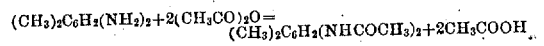

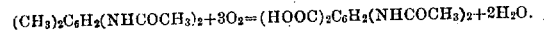

By boiling the latter substance with excess of hydrochloric acid, I obtain the hydrochlorid of 4.6-diamino-1.3-phthalic acid, according to the following equation:—

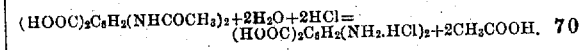

By dissolving the latter substance in caustic soda solution and acidifying with acetic acid, I obtain the new 4.6-diamino-1.3-phthalic acid, according to the following equations:—

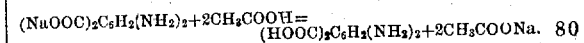

By boiling the 4.6-diacetamino-1.3-phthalic acid with excess of acetic anhydrid and concentrating the solution, I obtain crystals of another new body, a bis-acetanthranil, according to the following equation:—

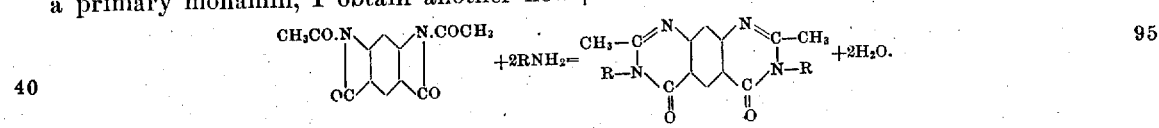

By condensing the latter substance with a primary monamin, I obtain another new substance according to the following equation:—

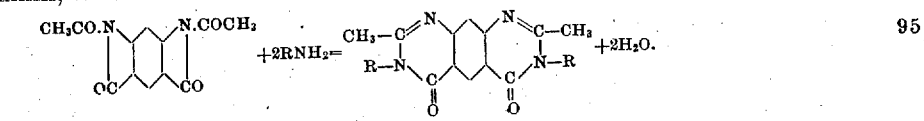

in which R is hydrogen or a simple or substituted alphyl or aryl radical. Or, by condensing the above bis-acetanthranil with an aromatic di-primary diamin, I obtain another new substance, according to the following equation:—

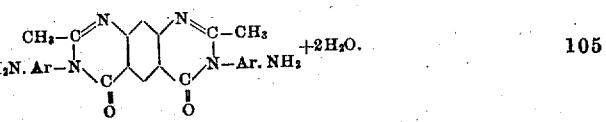

in which Ar is a simple or substituted aromatic nucleus.

By diazotizing the latter compounds in the well-known way and combining with suitable couplers, I produce new series of useful azo dyestuffs, all of which are characterized by containing the following nucleus:—

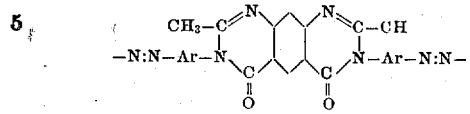

in which Ar is a simple or substituted aromatic nucleus.

From the 4.6-diacetamino-1.3-phthalic acid, I believe that other groups of dyes, as well as compounds valuable in the treatment of disease and in other ways, may be obtained, containing in common with the said azo dyestuffs the said generic nucleus:—

The compounds produced by condensing the said bis-acetanthranil with primary monamins or with aromatic primary diamins, as well as the dyestuffs obtained from these condensation products, all contain the following nucleus:—

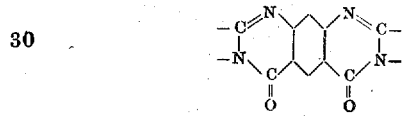

I understand that this is the first time that compounds have been produced containing this nucleus and that I have, therefore, discovered a new heterocyclic system. This specific nucleus is also contained in certain dyestuffs of quinolin yellow type which I have produced from condensation products of the said bis-acetanthranil and primary amins.

The following examples will serve to illustrate further the nature of my invention and how it can be carried into practical effect, but my invention is not limited to these examples. The parts are by weight:—

Example 1: 209 parts of the hydrochlorid of 4.6-diamino-1.3-xylene are mixed with 164 parts of fused sodium acetate; about 250 parts acetic anhydrid are then added and the mixture boiled for an hour. When cold, the mixture is poured into 1000 parts of warm water and the whole boiled down to half its original bulk and then allowed to cool. The crystals of 4.6-diacetamino-1.3-xylene which separate are filtered out, washed thoroughly with water and dried. Recrystallized from glacial acetic acid, the compound is obtained in the form of colorless needles, melting at about 295° C. (cor.) This is the pure 4.6-diacetamino-1.3-xylene. It is not a new substance, but has been described before in chemical literature. From this point on, all the compounds described are, I believe, entirely new. One part of this 4.6-diacetamino-1.3-xylene and two parts magnesium sulfate are added to 100 parts of water. The mixture is heated to boiling and three parts of finely pulverized potassium permanganate are added gradually to the boiling solution. When the oxidation is completed, the hot solution is filtered and the filtrate acidified with hydrochloric acid. The precipitated 4.6-diacetamino-1.3-phthalic acid is filtered out, washed with water and dried. Re-crystallized from 95% alcohol, it is obtained in long, colorless needles, melting at about 276° C.(cor.) This is the pure 4.6-diacetamino-1.3-phthalic acid. One part of this 4.6-diacetamino-1.3-phthalic acid is suspended in about five parts of concentrated hydrochloric acid and the mixture heated to boiling. After boiling for about ten or fifteen minutes, a clear solution is obtained and almost immediately pale yellowish needles of the hydrochlorid of 4.6-diamino-1.3-phthalic acid begin to separate. The boiling is continued for five minutes longer, the solution allowed to cool, the separated crystals are filtered out, washed with concentrated hydrochloric acid and dried. The crystals thus obtained consist of the hydrochlorid of 4.6-diamino-1.3-phthalic acid in practically pure condition, and melt at about 229–230° C. (cor.) One part of this hydrochlorid is suspended in about ten parts of water and dissolved by adding caustic soda to faintly alkaline reaction. On acidifying this solution with acetic acid, the free 4.6-diamino-1.3-phthalic acid separates as a colorless amorphous precipitate. The precipitated acid is filtered out and may be further purified by dissolving it in dilute caustic soda solution and re-precipitating with acetic acid. When pure, it forms a colorless powder, gradually turning pink on standing, and melts at about 235° C. (cor.) with decomposition. It is very slightly soluble in water, alcohol, benzole, ether, chloroform or amyl acetate. Boiled with excess of acetic anhydrid, it passes first into the 4.6-diacetamino-1.3-phthalic acid and then into the bis-acetanthranil hereinafter described. I have also produced many derivatives of the above 4.6-diacetamino-1.3-phthalic acid and of the 4.6-diamino-1.3-phthalic acid as, for example, salts, esters, and derivatives in which the hydrogens of the amino groups were replaced by other groups.

Example 2: One part of 4.6-diacetamino-1.3-phthalic acid is boiled with four parts of acetic anhydrid for half an hour or an hour. On cooling to room temperature, long, colorless, fine needles of the bis-acetanthranil separate. These crystals are filtered out, washed with acetic anhydrid, then with gasolene, and dried. As thus obtained, the bis-acetanthranil is pure and melts at about 282.3° C. (cor.) Boiled with water, it is gradually re-converted to the 4.6-diaceta-mino-1.3-phthalic acid again.

Example 3: One part of the above bis-acetanthranil is boiled for about fifteen minutes with an equal part by weight of anilin. The colorless crystals which separate from the solution on cooling are filtered out, washed with dilute acetic acid, then with water, and recrystallized from alcohol. The product thus obtained in fine, colorless needles, melts at about 315° C. (uncor.), and I believe has the following constitutional formula:—

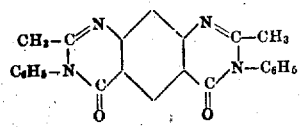

In lieu of the anilin above referred to, I have used successfully ammonia, methylamin, normal propylamin, beta naphthylamin, hydrazin and phenylhydrazin, and obtained condensation products of similar type. I believe that other bis-acylanthranils and other primary amins than those mentioned can also be used.

Example 4: One part of the above bis-acetanthranil is heated with two parts of di-orthoanisidin for five or ten minutes at 168–172° C. When cold, the mass is pulverized fine, washed thoroughly with dilute caustic soda solution, dissolved in dilute hydrochloric acid, filtered, the filtrate made slightly alkaline by the addition of caustic soda, the precipitate filtered out, washed thoroughly with water and dried. It is then generally sufficiently pure for the preparation of azo dyestuffs. If desired, it can be further purified by re-dissolving it in dilute hydrochloric acid and re-precipitating with caustic soda. When washed and dried, it forms a dark powder, melting at about 122° C. (cor.), readily soluble in 95% alcohol or in dilute hydrochloric acid, very slightly soluble in water or in dilute aqueous solutions of the caustic alkalies. This is one of my mother-substances for the production of azo dyestuffs, and I believe that it has the following constitutional formula:—

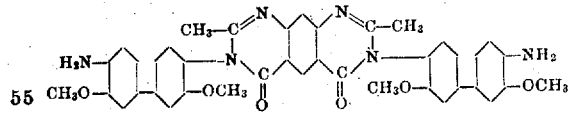

In lieu of the di-orthoanisidin above referred to, I have successfully employed the following di-primary aromatic diamins:—metaphenylene diamin, paraphenylene diamin, metatolyene diamin, metaxylylene diamin, benzidin, tolidin, and ethoxybenzidin. I believe that other aromatic di-primary diamins and other bis-acylanthranils than those above mentioned may also be used.

My experiments indicate that condensation products of the above type have the followng characteristics:—They contain two or more diazotizable primary amino groups. They are in most cases pulverulent solids, of definite melting- or decomposing-points; very slightly soluble in water or in dilute aqueous caustic soda solution, soluble in dilute hydrochloric or sulfuric acid, and more or less readily soluble in 95% alcohol. Dissolved in concentrated hydrochloric acid and treated with stannous chlorid, they suffer reduction. Most of them are strongly triboelectric. Diazotized in the well-known way, they yield tetrazo bodies which unite with suitable couplers to form valuable azo dyestuffs, and in this way I have produced a large number of these new dyes. Heated with phthalic anhydrid, in presence of zinc chlorid, they condense to new dyes of quinolin yellow type. All of these condensation products are further characterized by containing the following nucleus:—

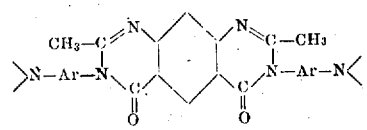

in which Ar is a simple or substituted aromatic nucleus.

The condensation products obtained by the above process vary in properties according to the particular bis-acylanthranil and diamin used. Thus, for example, the condensation products obtained from bis-acetanthranil and various diamins show the following properties:—from metaphenylene diamin, the condensation product obtained is in the form of a nearly colorless powder, which softens at about 255° C. and melts at about 265–266° C. (cor.); from paraphenylene diamin, the condensation product obtained is in the form of a dark gray powder, which melts with blackening at about 260–261° C. (cor.); from 2.4-diamino toluene, the condensation product obtained is in the form of a nearly colorless powder, melting at about 255–256° C. (cor.); from 4.6-diamino-1.3-xylene, the condensation product is in the form of a yellowish powder, melting at about 275–276° C. (cor.); from benzidin, the condensation product obtained is in the form of a slate-colored powder, which remains unmelted at 325° C. (cor.); from orthotolidin, the condensation product obtained is in the form of a light-brown powder, melting at about 115–116° C. (cor.); from ethoxybenzidin, the condensation product obtained is in the form of a dark powder, melting at about 200–201° C. (cor.)

Example 5: 696 parts of the condensation product obtained from the bis-acetanthranil and di-orthoanisidin (as described in Example 4) is dissolved in dilute hydrochloric acid so that the solution contains a total of 150 parts hydrogen chlorid. The solution is cooled to 0° C. and diazotized by the addition of 138 parts sodium nitrite in aqueous solution. This tetrazo solution is then stirred into a strongly alkaline solution of 636 parts of 1.8-diaminonaphthalene-4.6-disulfo acid. The alkaline solution is slightly acidified with hydrochloric acid, then made slightly alkaline again by the addition of caustic soda, and the dyestuff is precipitated by the addition of sodium chlorid to the solution. It is a blue-black powder, soluble in water, and in acid bath dyes silk from violet to deep blue depending upon the amount of dyestuff used. This is one of my new azo dyestuffs. In lieu of the condensation product used in the above example, I have successfully employed the other condensation products described in Example 4, and I believe that other compounds of similar structure may also be employed. In lieu of the 1.8-diaminonaphthalene-4.6-disulfo acid used above as the coupler, I have successfully employed many other well-known couplers (chiefly aromatic amins, phenols, and their sulfonic and carboxylic acids), and I believe that most of the couplers generally used in the preparation of azo dyestuffs can also be used successfully with my new tetrazo bodies for the production of new azo dyestuffs.

Instead of using the above condensation products from bis-acetanthranil and an aromatic di-primary diamin as primary components in the production of azo dyestuffs, I have also used them as secondary components or couplers to combine with various well-known diazo and tetrazo bodies and in this way have produced other new azo dyes. Of these new azo dyestuffs, those of paraminoazo structure may be again diazotized and coupled, and I have in this way obtained other new dyestuffs of polyazo character. My experiments indicate that all of these azo dyestuffs are substantive for silk and wool. Some are substantive for cotton. They include acid, basic, and mordant dyes, and can be applied to the fiber in substantially the same manner as other acid, basic, and mordant azo dyestuffs. They may be applied to the fiber as finished dyes, or the diazotizing and coupling may be carried out within the fiber itself, thus producing what are known as "developed dyes," "ingrain colors," &c. As a class, these new azo dyestuffs are characterized by the beauty and peculiarity of the shades they produce; by their fastness to light, to alkali, to acid, to washing and milling, and to bleaching. They penetrate the fiber thoroughly and equalize well. All are more or less readily soluble in water. I understand that these new azo dyestuffs differ from all others in containing the following nucleus:—

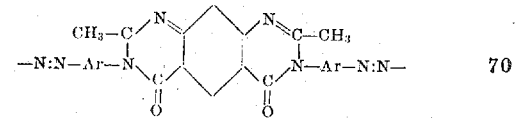

in which Ar is a simple or substituted aromatic nucleus.

My experiments indicate that these new azo dyestuffs show the following properties:—Their solutions in concentrated hydrochloric acid are rapidly reduced and decolorized by the addition of stannous chlorid, the azo groups being split between the two nitrogens. If the naphthotetrazin component be separated from this reduced solution, re-diazotized and combined with the same component or components used in the production of the original dyestuff, an azo dyestuff different from the original one results; in other words, these new azo dyestuffs contain double bonds and CO groups, either or both of which may undergo some reduction during the treatment and the naphthotetrazin component separated from the reduced solution is not the same as the one started with. They dissolve in concentrated sulfuric acid to richly colored solutions, the color varying with the dyestuff used. On diluting these solutions with water, the color base generally separates in flocculent form. They can be condensed with phthalic anhydrid, in presence of zinc chlorid, to new dyes of quinolin yellow type.

In the following table the shades of some of the new dyestuffs obtained from bis-acetanthranil are given. The first column gives the diamin with which the bis-acetanthranil was condensed to form the mother-substance, the second the coupler used with the diazotized mother-substance, and the third the color on silk:—

| | | | |
|---|---|---|---|
| 1. Metaphenylene diamin. | 1-naphthol-4-sulfo acid | Bright red | |
| 2. Do | 1.5-dioxynaphthalene-3.7-disulfo acid. | Rose red. | |
| 3. Do | 1.8-diaminonaphthalene-4.6-disulfo acid. | Purple. | |
| 4. Do | 8-amino-1-naphthol-3.6-disulfo acid. | Purple. | |
| 5. Paraphenylene diamin. | 1-naphthylamine-6-sulfo acid | Brown. | |
| 6. Do | 1-naphthol-4-sulfo acid | Light catawba. | |
| 7. Benzidin | 1-naphthol-4-sulfo acid | Rose red. | |
| 8. Do | 1.5-dioxynaphthalene-3.7-disulfo acid. | Dark pink. | |
| 9. Do | 1.8-diaminonaphthalene-4.6-disulfo acid. | Purple. | |
| 10. Do | 8-amino-1-naphthol-3.6-disulfo acid. | Purple. | |
| 11. Tolidin | Salicylic acid | Ochre yellow. | |
| 12. Do | Resorcinol | Light brown. | |
| 13. Di-orthoanisidin. | 1-naphthol-4-sulfo acid | Dark violet. | |
| 14. Do | 1.5-dioxynaphthalene-3.7-disulfo acid. | Red purple. | |
| 15. Do | 1.8-diaminonaphthalene-4.6-disulfo acid. | Dark blue. | |
| 16. Do | 8-amino-1-naphthol-3.6-disulfo acid. | Dark blue. | |
| 17. Ethoxybenzidin. | 2-naphthylamine-5-sulfo acid | Orange red. | |
| 18. Do | 2-naphthol-3.7-disulfo acid | Heliotrope. | |

Having thus described my invention, what I claim is:

1. The process of producing new substances containing the nucleus:

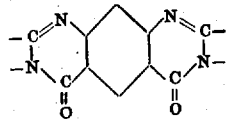

which comprises condensing a bis-acetanthranil with a primary amin.

2. As an article of manufacture, a substance which can be obtained from 4.6-diamino-1.3-xylene and which contains the nucleus:—

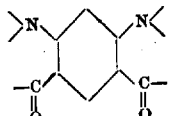

3. As an article of manufacture, a substance which can be obtained from a bis-acylanthranil and which contains the nucleus:—

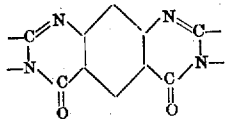

4. As a new product, a substance which can be obtained by condensing a bis-acetanthranil with a primary amin, and whose constitutional formula corresponds to the following:—

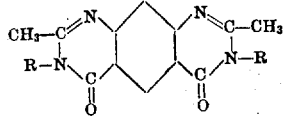

in which R is a carbon containing group.

5. As a new product, a substance which can be obtained by condensing a bis-acetanthranil with an aromatic primary diamin, and whose constitutional formula contains the following:—

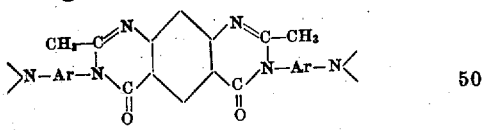

in which Ar. is an aromatic residue.

6. As a new product, an azo dyestuff which can be produced from a condensation product of a bis-acetanthranil and an aromatic di-primary diamin, and which contains the following nucleus:—

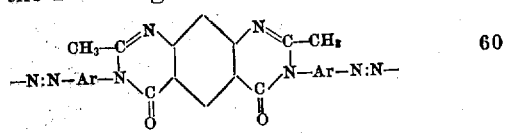

in which Ar. is an aromatic residue, and whose solution in concentrated hydrochloric acid is reduced and de-colorized by the addition of stannous chlorid, the azo groups being split between the two nitrogens and one product of this splitting being a diamino derivative of a reduced 1, 3, 7, 9-naphthotetrazin nucleus which, when diazotized and coupled with the other component or components used in the preparation of the original dyestuff, gives an azo dyestuff different from the original one.

In testimony whereof, I have hereunto signed my name in the presence of two subscribing witnesses.

MARSTON TAYLOR BOGERT.

Witnesses:
FRANK E. ROFFMAN,
W. A. PAULING.

---

It is hereby certified that in Letters Patent No. 1,032,734, granted July 16, 1912, upon the application of Marston Taylor Bogert, of New York, N. Y., for an improvement in "Products Obtainable from 4.6—Diamino—1.3—Xylene and Processes of Making," an error appears in the printed specification requiring correction as follows: Page 2, line 5, formula, last symbol in line for "CH" read $CH_3$; and that the said Letters Patent should be read with this correction therein that the same may conform to the record of the case in the Patent Office.

Signed and sealed this 17th day of September, A. D., 1912.

[SEAL.]

C. C. BILLINGS,

*Acting Commissioner of Patents.*

Having thus described my invention, what I claim is:

1. The process of producing new substances containing the nucleus:

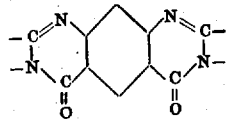

which comprises condensing a bis-acetanthranil with a primary amin.

2. As an article of manufacture, a substance which can be obtained from 4.6-diamino-1.3-xylene and which contains the nucleus:—

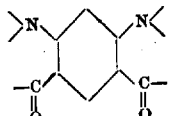

3. As an article of manufacture, a substance which can be obtained from a bis-acylanthranil and which contains the nucleus:—

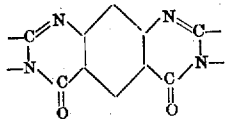

4. As a new product, a substance which can be obtained by condensing a bis-acetanthranil with a primary amin, and whose constitutional formula corresponds to the following:—

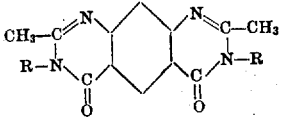

in which R is a carbon containing group.

5. As a new product, a substance which can be obtained by condensing a bis-acetanthranil with an aromatic primary diamin, and whose constitutional formula contains the following:—

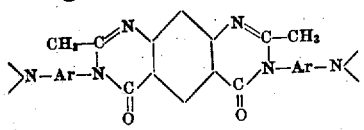

in which Ar. is an aromatic residue.

6. As a new product, an azo dyestuff which can be produced from a condensation product of a bis-acetanthranil and an aromatic di-primary diamin, and which contains the following nucleus:—

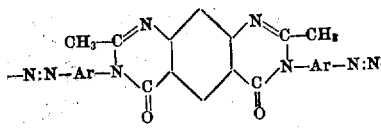

in which Ar. is an aromatic residue, and whose solution in concentrated hydrochloric acid is reduced and de-colorized by the addition of stannous chlorid, the azo groups being split between the two nitrogens and one product of this splitting being a diamino derivative of a reduced 1, 3, 7, 9-naphthotetrazin nucleus which, when diazotized and coupled with the other component or components used in the preparation of the original dyestuff, gives an azo dyestuff different from the original one.

In testimony whereof, I have hereunto signed my name in the presence of two subscribing witnesses.

MARSTON TAYLOR BOGERT.

Witnesses:
FRANK E. ROFFMAN,
W. A. PAULING.

---

It is hereby certified that in Letters Patent No. 1,032,734, granted July 16, 1912, upon the application of Marston Taylor Bogert, of New York, N. Y., for an improvement in "Products Obtainable from 4.6—Diamino—1.3—Xylene and Processes of Making," an error appears in the printed specification requiring correction as follows: Page 2, line 5, formula, last symbol in line for "CH" read $CH_3$; and that the said Letters Patent should be read with this correction therein that the same may conform to the record of the case in the Patent Office.

Signed and sealed this 17th day of September, A. D., 1912.

[SEAL.]

C. C. BILLINGS,

*Acting Commissioner of Patents.*

It is hereby certified that in Letters Patent No. 1,032,734, granted July 16, 1912, upon the application of Marston Taylor Bogert, of New York, N. Y., for an improvement in "Products Obtainable from 4.6—Diamino—1.3—Xylene and Processes of Making," an error appears in the printed specification requiring correction as follows: Page 2, line 5, formula, last symbol in line for "CH" read $CH_3$; and that the said Letters Patent should be read with this correction therein that the same may conform to the record of the case in the Patent Office.

Signed and sealed this 17th day of September, A. D., 1912.

[SEAL.]

C. C. BILLINGS,

*Acting Commissioner of Patents.*